United States Patent
Case (10) Patent No.: US 7,692,670 B2
(45) Date of Patent: Apr. 6, 2010

(54) METHODS AND SYSTEMS FOR SCALING AND ROTATING AN IMAGE IN A SINGLE OPERATION

(75) Inventor: Christopher W. Case, Georgetown, KY (US)

(73) Assignee: Lexmark International, Inc., Lexington, KY (US)

(*) Notice: Subject to any disclaimer, the term of this patent is extended or adjusted under 35 U.S.C. 154(b) by 638 days.

(21) Appl. No.: 11/141,103

(22) Filed: May 31, 2005

(65) Prior Publication Data

US 2006/0269163 A1 Nov. 30, 2006

(51) Int. Cl.
G09G 5/00 (2006.01)

(52) U.S. Cl. .................................................. 345/648

(58) Field of Classification Search ............... 345/619, 345/648, 649, 654, 657, 660–679, 653; 382/276, 382/289, 293, 295–298
See application file for complete search history.

(56) References Cited

U.S. PATENT DOCUMENTS

| | | | |
|---|---|---|---|
| 5,050,225 A | 9/1991 | Itoh | |
| 5,384,645 A | 1/1995 | Hasegawa et al. | |
| 5,568,600 A | 10/1996 | Kaba | |
| 6,011,866 A * | 1/2000 | Donelly et al. | 382/295 |
| 6,097,855 A | 8/2000 | Levien | |
| 6,215,915 B1 * | 4/2001 | Reyzin | 382/296 |
| 6,281,875 B1 | 8/2001 | Zhao et al. | |
| 6,549,683 B1 | 4/2003 | Bergeron et al. | |
| 6,560,376 B2 | 5/2003 | Kimbell et al. | |
| 6,801,674 B1 | 10/2004 | Turney | |
| 6,812,935 B1 | 11/2004 | Joe et al. | |
| 2003/0151614 A1 | 8/2003 | Knee et al. | |
| 2006/0103649 A1 * | 5/2006 | Whatmough | 345/427 |

OTHER PUBLICATIONS

Steve McMahon, "Scale, Rotat, Skew and Transform Images Using GdI+", Apr. 11, 2003, pp. 1-2 www.vbaccelerator.com.*
Foley et al., "Computer Graphics: Principles and Practice", Second Edition in C, p. 523-525, 1996.*

* cited by examiner

Primary Examiner—Ryan R Yang (57) ABSTRACT

A method of scaling and rotating an image includes generating a scaled and rotated pixel grid from a transformation operation applied to an input pixel grid. The input pixel grid comprises a plurality of pixels representing an original image, and the transformation may implement the simultaneous scaling and rotation of the input pixel grid. The respective values of a plurality of output pixels in the scaled and rotated pixel grid are then determined by interpolation.

21 Claims, 4 Drawing Sheets

METHODS AND SYSTEMS FOR SCALING AND ROTATING AN IMAGE IN A SINGLE OPERATION

CROSS REFERENCES TO RELATED APPLICATIONS

None.

STATEMENT REGARDING FEDERALLY SPONSORED RESEARCH OR DEVELOPMENT

None.

REFERENCE TO SEQUENTIAL LISTING, ETC.

None.

BACKGROUND

1. Field of the Invention

This invention is directed generally to image processing, and more particularly, to methods and systems for scaling and rotating an image in a single operation.

2. Description of the Related Art

Conventional scanners, printers, copiers and multifunction devices typically have the ability to scale an image to satisfy internal image pipeline requirements or to satisfy a user's desire to enlarge or reduce the image. Those devices also typically permit the rotation of an image to correct a rotation of the source image. The rotation might be due to user error in placing the source on the scanner, or it may come from mechanical tolerances when the page is fed using an Auto-Document Feeder (ADF). There may also be additional uses for a rotation function, such as aligning multiple input images to be printed on a single output page, or even user directed rotation of a source image.

If a source image needs to be both scaled and rotated, the traditional method would be to perform the operations separately in series. It is advantageous that a rotation be performed on a larger image to increase the quality of the output, which means that in order to achieve the best quality output document, the order of operations should be switched for an enlargement versus a reduction. However, this will consume more bandwidth than if the smaller image is the one being rotated, which negatively impacts the resultant quality of an output image. Additionally, where both scaling and rotation are implemented, the image will be subjected to two interpolation operations, which results in potentially significant quality reductions due to the performance of each operation individually.

Therefore, what is needed are methods and systems to rotate and scale an image as quickly and efficiently as possible while imparting minimal degradation to the quality of the output image.

SUMMARY OF THE INVENTION

The present invention is directed to a method and system for scaling and rotating an image in a single operation, such that separate scaling and rotating operations are not required. According to an embodiment, a rotated and scaled output grid, and interpolation, such as bilinear or bicubic interpolation, are used to calculate output pixel values for a scaled and rotated image. The output pixel values for the scaled and rotated image are calculated in a single operation. Thus, whereas separate scaling and rotation algorithms each require interpolation to achieve resultant pixel values, the present invention uses a single interpolation operation to achieve both scaling and rotation. Because the scaling and rotating operations are combined, rather than executed in series, the resulting image has better image quality, in part because information is introduced from the pixels that immediately surround the output pixels, instead of from satellite neighbors that would be used in interpolation for a single scaling or rotating operation. Additionally, the single operation only accumulates rounding errors once. Further, the single interpolation operation also requires less memory and time to execute because the original image is read and stored in memory once, and only a single operation is performed.

According to one embodiment, there is disclosed a method of scaling and rotating an image. The method includes scaling and rotating an image to generate a scaled and rotated version of the image, where the scaling and rotating are implemented simultaneously by a transformation operation.

According to an aspect of the invention, the transformation operation includes a calculation based, at least in part, on both a scaling factor and an angle of rotation, and the scaled and rotated version of the image is scaled by an amount identified by the scaling factor and rotated by an amount identified by the angle of rotation. According to another aspect of the invention, the transformation operation is an upscale or downscale, or an upscale or downscale combined with a rotation. According to yet another aspect, the transformation operation can implement the scaling and rotating of an input pixel grid corresponding to the image to be rotated and scaled. Further, the transformation operation may include an interpolation operation, and the interpolation operation may be implemented by an Application Specific Integrated Circuit (ASIC). Additionally, the method may include storing at least one table, where the at least one table is used, in part, to generate the scaled and rotated image.

According to another embodiment of the invention, there is disclosed a method of scaling and rotating a pixel grid. The method includes generating an output pixel grid from an input pixel grid, where the output pixel grid is scaled and rotated from the input pixel grid, and determining the values of a plurality of output pixels of the output pixel grid, where the output pixel grid is generated by at least one calculation implementing the simultaneous scaling and rotation of the input pixel grid.

According to an aspect of the invention, determining the values of the plurality of output pixels includes determining the values of the plurality of output pixels using interpolation. According to another aspect of the invention, interpolating includes bilinear, or bicubic interpolation. Further, generating an output pixel grid from an input pixel grid may include calculating a single output point of the output pixel grid using a corresponding input point from the input pixel grid. According to yet another aspect, generating an output pixel grid from an input pixel grid may include using the single output point of the output pixel grid to identify the location of one or more of the plurality of output pixels. Generating an output pixel grid from an input pixel grid may also include calculating the location of the one or more of the plurality of output pixels based, at least in part, on both a scaling factor and an angle of rotation. According to another aspect, the method includes storing at least one table, where the at least one table is used, in part, to generate the output pixel grid.

According to yet another embodiment of the invention, there is disclosed a method for image rotation and scaling. The method includes generating a rotated and scaled output pixel grid from an original image pixel grid, where the output pixel grid is generated by at least one calculation implementing the simultaneous scaling and rotation of the input pixel grid. The method also includes calculating, using the output pixel grid relative to the original image pixel grid and the input pixel values, to determine the value of at least one output pixel of the output pixel grid.

According to one aspect of the invention, the method includes establishing a distance between one or more grid points of the original image pixel grid. The distance may be used, in part, to generate the rotated and scaled output pixel grid. The distance may also be used, in part, to perform the interpolation. According to another aspect, the method may also include storing at least one table, where the at least one table is used, in part, to generate the rotated and scaled output pixel grid.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

DETAILED DESCRIPTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

As will be appreciated by one skilled in the art, the present invention may be embodied as a method, a data processing system, or a computer program product. Accordingly, the present invention may take the form of an entirely hardware embodiment, an entirely software embodiment or an embodiment combining software and hardware aspects. Furthermore, the present invention may take the form of a computer program product on a computer-readable storage medium having computer-readable program code means embodied in the storage medium. Any suitable computer-readable storage medium may be utilized including hard disks, CD-ROMs, flash drives, optical storage devices, magnetic storage devices, and the like, as are known in art.

The present invention is described below with reference to block diagrams and flowchart illustrations of methods, apparatuses (i.e., systems) and computer program products according to an embodiment of the invention. It will be understood that blocks of the block diagrams and flowchart illustrations, and combinations of blocks in the block diagrams and flowchart illustrations, respectively, may be implemented by computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Figure 1:
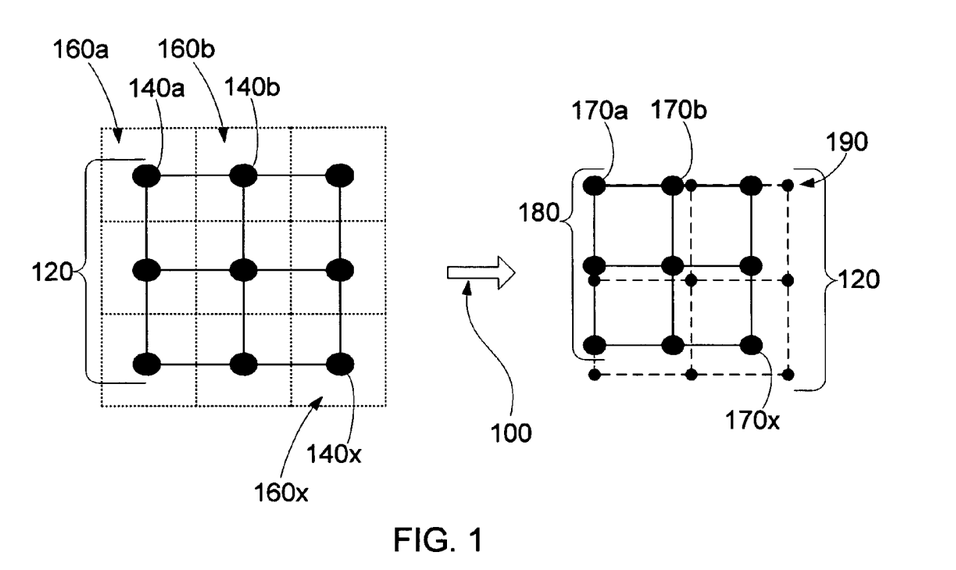
FIG. 1 shows a pixel grid transformation illustrating the conversion of an input image pixel grid to a scaled pixel grid, according to an illustrative embodiment of the present invention.

FIG. 1 shows a pixel grid transformation 100 of an input image pixel grid 120 to a scaled pixel grid 180, according to an illustrative embodiment of the present invention. The input image pixel grid 120 is illustrated in FIG. 1 as including a plurality of input points 140*a*, 140*b*, . . . , 140*x* representing the respective center points of input image pixels 160*a*, 160*b*, . . . , 160*x* (shown in dashed lines). Thus, the input points 140*a*, 140*b*, . . . , 140*x* identify the distinct position of each input image pixel 160*a*, 160*b*, . . . , 160*x* that makes up an image. The scaled image pixel grid 180 is also illustrated with output points 170*a*, 170*b*, . . . , 170*x* that represent the respective centers of output pixels (not illustrated) of a scaled version of the image. As illustrated, the output points 170*a*, 170*b*, . . . , 170*x* defining the scaled image pixel grid 180 are positioned closer together than the input image points 140*a*, 140*b*, . . . , 140*x* of the input image pixel grid 120. As described in detail below, this is the result of an upscale operation performed on the original image. The input image pixel grid 120 is illustrated in dashed lines directly behind the scaled grid 180 in FIG. 1 to illustrate that the scaled grid 180 has a smaller scale than the input image pixel grid 120.

As will be appreciated by those of ordinary skill in the art, scaling an image involves the creation of output pixels that are related to the immediate surrounding pixels from a target area in an input image. In particular, a geometric transformation may be used to compute the coordinates of output pixels from input pixels. The value of each output pixel may be established via one or more calculations, such as a weighted calculation, interpolation, or another method known in the art. When performing an enlargement, or upscale, it will be appreciated that more pixels are created in an output image than existed in the input image. In contrast, when performing a reduction, or a downscale, fewer pixels are created in the output image than existed in the input image. The example shown in FIG. 1 illustrates a scaled pixel grid 180 that represents a 133% enlargement of an original image. To increase the size of an original image requires the generation of additional pixels by dividing the size of an input pixel grid by a scaling factor to form an output grid. In FIG. 1 the scaled grid 180 has a smaller scale than the input image pixel grid 120 as a result of a transformation 100 in which the input image pixel grid 120 is divided by a 1.33 scaling factor to achieve the scaled grid 180.

When performing an upscale or downscale, output pixels are not typically positioned at the same location as a source pixel location. Rather, they may fall between input pixels. As shown in the illustrative scaled grid 180 of FIG. 1, the upper-leftmost output point 170a falls in the same position as the upper-leftmost input point 140a, and thus the upper leftmost output pixel represented by that output point 170a may be a copy of the corresponding upper leftmost input pixel represented by the corresponding input point 140a. However, the location of the remainder of the output pixels in the scaled grid 180 fall at least partially between the input pixels. This is illustrated by the output points 170b, . . . , 170x being displaced or shifted from corresponding input points 140b, . . . , 140x. For instance, the output point 170b is located partially in between input points 140a and 140b on the top row 190, so that the output pixel represented by the output point 170b is influenced and thus determined by the input pixels represented by input points 140a and 140b. It will be appreciated that the output pixels on the other lines, such as the output pixel represented by output point 170x, fall, at least in part, in the middle of four input pixels. Thus, after the location of output points are determined using an output grid, the value of output pixels are computed using one or more calculations that consider the value of the corresponding one or more input pixels. One such calculation may be the interpolated combination of input pixels closest to the output pixels.

As is known in the art, determining the value of an output pixel in a scaled image may be accomplished using interpolation, such as bilinear interpolation, which is sometimes referred to as weighted averaging or first-order interpolation. Bilinear interpolation is achieved by performing linear interpolation in the x and y directions from an output point. Thus, bilinear interpolation interpolates pixels along each row, and then each column, of a source image. Bilinear interpolation assigns the value of an output point that is a bilinear function of the four pixels nearest the corresponding point in the original grid. In bilinear interpolation, each output pixel is located with coordinates at a distinct point in an output grid.

With linear interpolation, given a point positioned at a set distance between two known points, the value of the point can be calculated by taking the weighted average of each known point. The equation for linear interpolation of an output pixel represented by an output point ("pt3") based on two known input pixels represented by input points ("pt1" and "pt2") is:

$$\text{Value}(pt3) = \qquad [1]$$

-continued
$$\frac{\text{Dist}(pt3 - pt1)}{\text{Dist}(pt2 - pt1)} * \text{Value}(pt2) + \frac{\text{Dist}(pt2 - pt3)}{\text{Dist}(pt2 - pt1)} * \text{Value}(pt1)$$

The above calculation illustrates interpolation of an output pixel in only one direction. For instance, the above calculation may be used to calculate the output pixel is represented by output point 170b on line 190 using input points 140a and 140b. Bilinear interpolation uses similar calculations, but uses calculations of four pixels surrounding an output point to determine an output pixel value. To accomplish bilinear interpolation using four surrounding pixels, the weighted average of the top two pixels is calculated, as is the weighted average of the bottom two pixels. This provides the X direction scaling. The weighted average of the resultant X direction scaled pixels are then calculated to obtain the Y direction scaling, which provides the final output pixel value. Because the use of bilinear interpolation to achieving a scaled image is known in the art, bilinear interpolation will not be further discussed herein.

Although the present invention is described hereinafter with the use of bilinear interpolation for determining output pixel values, it should be appreciated by those of ordinary skill in the art that other methods or calculations, and other methods interpolation, may be implemented to achieve scaling and rotating an image, as well as scaling and rotating an image in a single operation as described in detail below with respect to FIGS. 3-5. Thus, one of ordinary skill in the art will appreciate that bilinear interpolation is discussed herein as an illustrative and non-limiting example, and that other calculations or methods may be used to determine and/or assign output pixels their respective values in a simultaneously scaled and rotated image.

Figure 2:
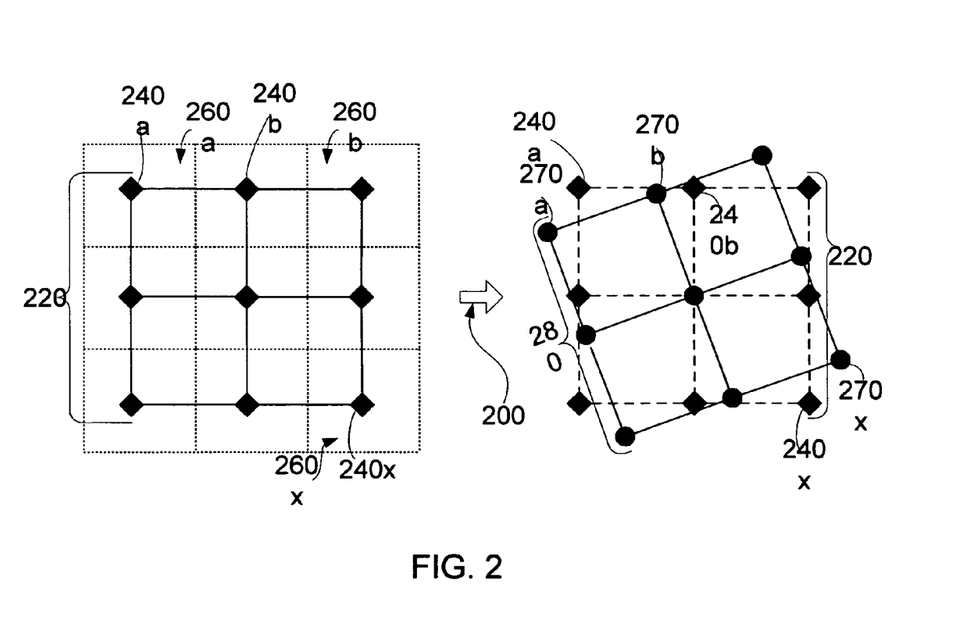
FIG. 2 shows a pixel grid transformation illustrating the conversion of an input image pixel grid to a rotated image pixel grid, according to an illustrative embodiment of the present invention.

FIG. 2 shows a pixel grid transformation 200 of an input image pixel grid 220 to a rotated image pixel grid 280, according to an illustrative embodiment of the present invention. Like the input image pixel grid 120 of FIG. 1, the input image pixel grid 220 of FIG. 2 includes input points 240a, 240b, . . . , 240x that identify the distinct center position of each input image pixel 260a, 260b, . . . , 260x that makes up the image prior to its rotation. Similarly, the rotated image pixel grid 280 includes a plurality of output points 270a, 270b, . . . , 270x that represent the respective centers of output pixels (not illustrated) of a rotated version of the image.

It will be appreciated by those of ordinary skill in the art that rotating an image is achieved in a similar manner to the scaling of an image. However, as shown in FIG. 2, the rotated image pixel grid 280 is the same size as the input image pixel grid 220, but is rotated from the input image pixel grid 220 by a specific angle. The equation below relates the input grid points and the output grid points, where S and D refer to grid points in the source or original image and scaled and rotated destination image, respectively:

$$S_x = D_x \Delta \cos(\theta) + D_y \Delta \sin(\theta)$$

$$S_y = D_y \Delta \cos(\theta) - D_x \Delta \sin(\theta) \qquad [2]$$

Once the grid has been created using the above equations, as is known in the art, the output pixel values can be calculated or determined, for instance, using bilinear interpolation, where the weights used in bilinear interpolation are based on the X and/or Y distances of an output point from two or more input grid points. As shown in FIG. 2, a single output grid point, such as 270b, may fall between a set of four input points, which is similar to what may arise with output grid points in a scaled output grid, as discussed with respect to FIG. 1. As with the scaling operations described above with respect to FIG. 1, the source grid point may not correspond to a single pixel in the source. Thus, the value assigned to a pixel corresponding to an output point is computed as an interpolated combination of the pixel values of the closest input points. It will be appreciated that trigonometric functions such as the equations [2] described above may be slow or difficult to compute in real-time or near real-time when an image rotation is desired.

According to an embodiment of the invention, simplified operations may be used to replace the equations [2] described above after those equations [2] are used to calculate the first output grid point relative to the input grid. According to an embodiment, the first output grid point may be the upper left corner point of the output grid, such as output grid point 270a in FIG. 2. The remaining grid points may then be calculated relative to previous values as shown in the equations [3] below:

$$S_x = S_{x-1} + \Delta \cos(\theta) \quad S_x = S_{PrevLine} + \Delta \sin(\theta)$$

$$S_y = S_{y-1} - \Delta \sin(\theta) \quad S_y = S_{PrevLine} + \Delta \cos(\theta) \quad [3]$$

The left set of the above equations [3] may be applied on a point by point basis as a horizontal grid line is created. To move to the beginning of the next grid line in an output grid, the right set of equations are used and are based on the starting grid point of the previous line. The distance between input pixels may be defined as Δ and may be set to equal 1 when using floating-point math. As a result, the sine and cosine values in the above equations [3] are constant and only need to be calculated once. It will be appreciated that the equations [3] above, which are also referred to herein as accumulating grid equations, can create the same output grid as the original equations [2]. As with scaling, once the output grid is generated, calculations, such as bilinear interpolation, may be used to generate the output pixels for the rotated image.

It will be appreciated that scaling and rotating images as described above with respect to FIGS. 1 and 2 utilize input and output grids to locate the correct input pixels that contribute to each output. Further, both scaling and rotating operations may use interpolation, such as bilinear interpolation, to calculate the resultant pixel values for the output image. Unfortunately, however, where both a scaled and rotated image is desired, implementing the scaling and interpolation operations separately in series results in unnecessary degradation to an image, as interpolation occurs twice, and pixels may be needlessly influenced by neighboring pixels. Separate scaling and rotating operations also result in multiple calculations and may take a greater time and memory to complete than if the scaling and rotating occurred in a single operation, even where simplified calculations, such as the equations [3] described immediately above, are used.

Figure 3:
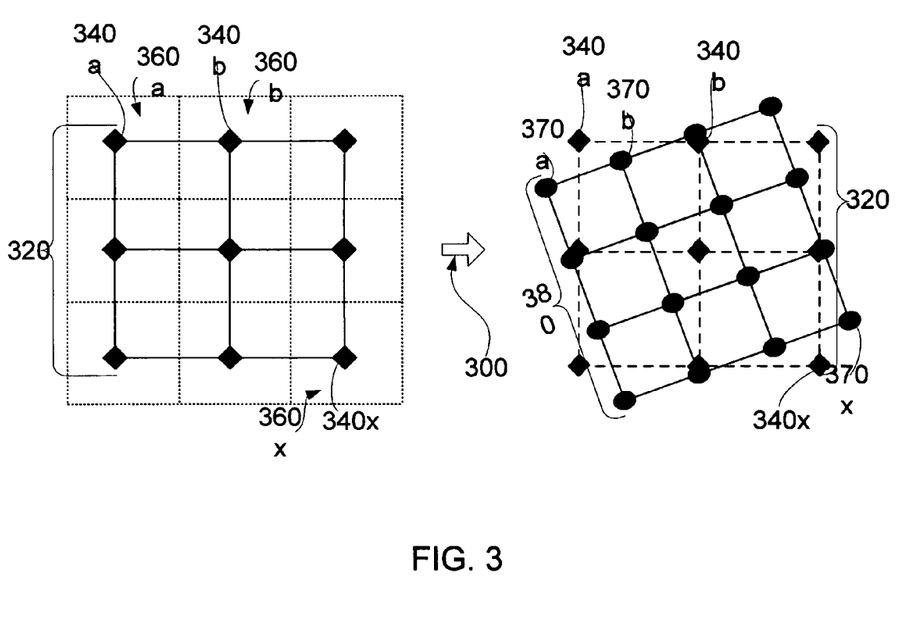
FIG. 3 shows a pixel grid transformation illustrating the conversion of an input image pixel grid to a scaled and rotated image pixel grid, according to an illustrative embodiment of the present invention.
Figure 4:
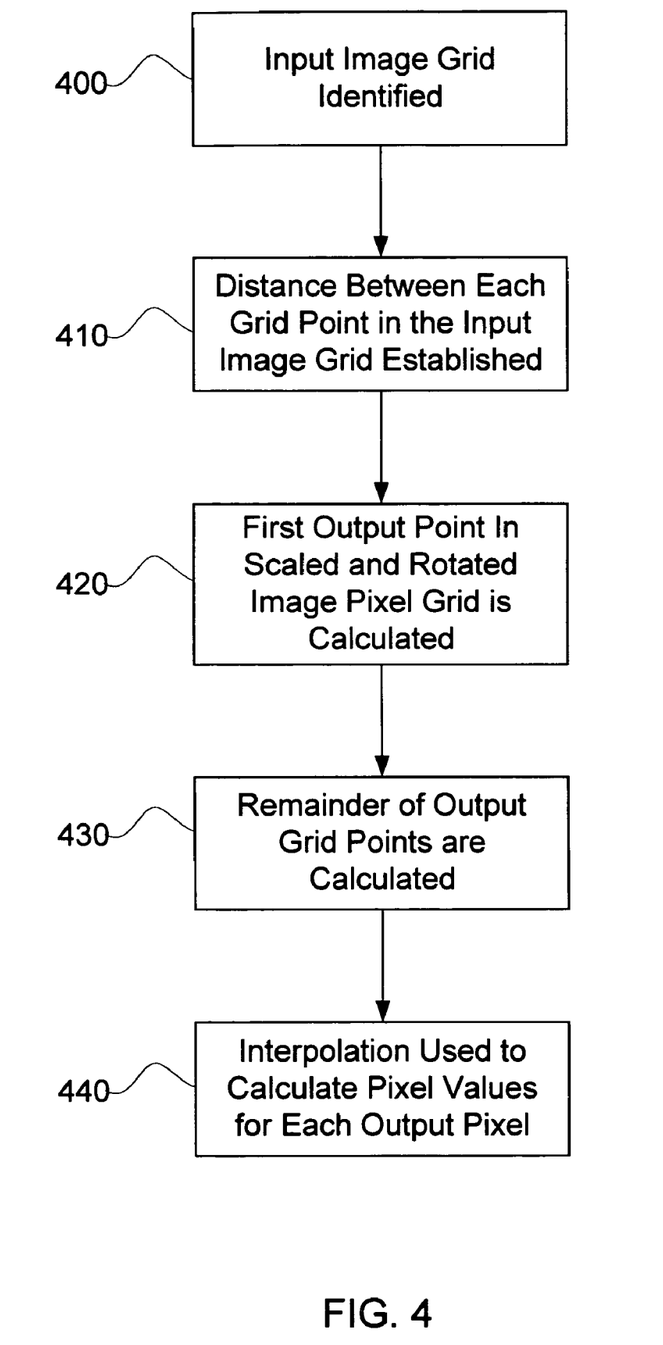
FIG. 4 is a block diagram flowchart illustrating a method of implementing scaling and rotating of an image in a single operation, according to an embodiment of the invention.
Figure 5:
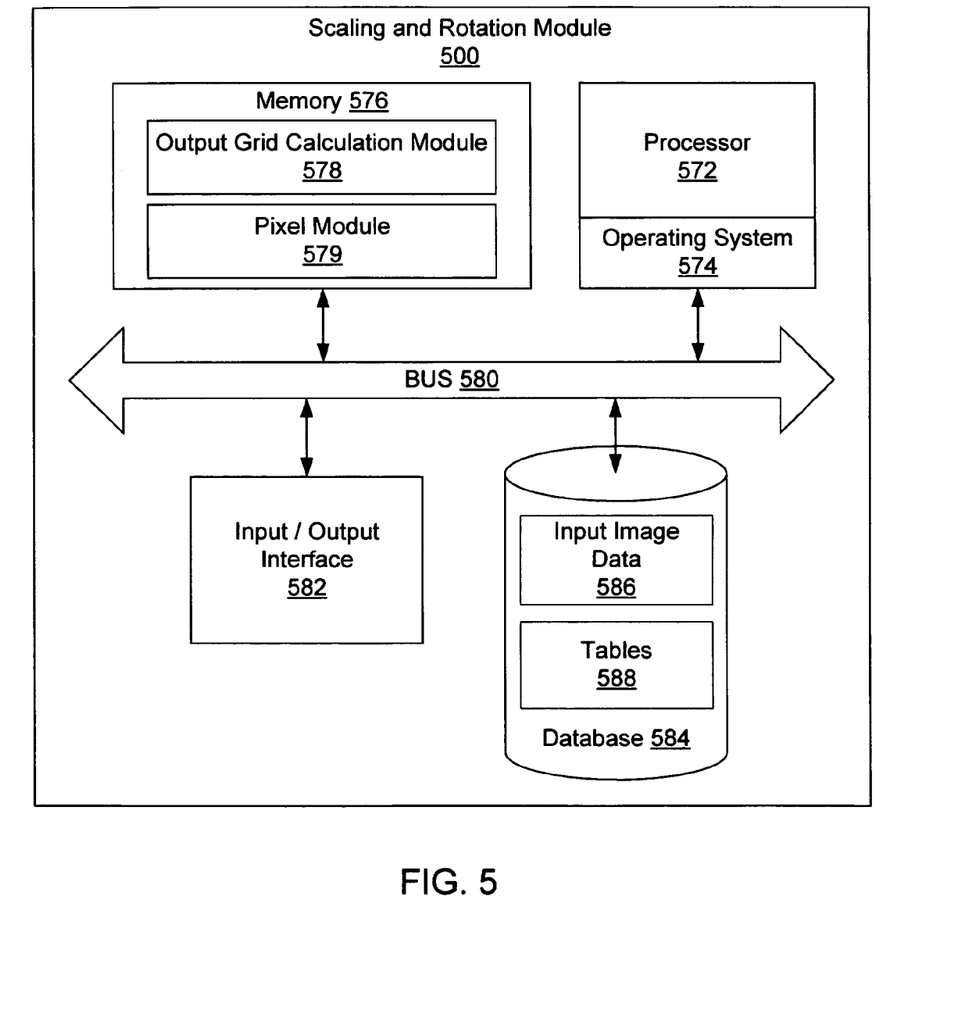
FIG. 5 shows a block diagram of an image-scaling and rotating module, according to an embodiment of the present invention.

According to an embodiment of the present invention described with respect to FIGS. 3-5, an image may be scaled and rotated in a single operation. Transforming the image in a single operation results in better image quality by only accumulating rounding error once and by only introducing information that is from the pixels that immediately surround the output pixels, instead of allowing some influence from satellite neighbors. This method also requires less time to complete because the image is read from memory and stored to memory only once, and that calculations, such as interpolation, to determine pixel values are performed only once.

According to an embodiment of the invention, an output pixel grid is first generated that combines scaling and rotating. Thereafter, a single calculation, such as a single interpolation operation, may be used to calculate output pixel values. According to an embodiment of the invention, a scaled and rotated output grid may be created in two steps, by either scaling then rotating, or by rotating and scaling, after which the single interpolation operation is executed. However, the scaled and rotated output grid may also be created in a single step. According to one aspect of the invention, a scaled and rotated output grid may be generated using the following scaled and rotated grid equations:

$$S_X = S_{X-1} + \frac{\Delta \cos(\theta)}{ScaleFactor} \quad S_X = S_{PrevLine} + \frac{\Delta \sin(\theta)}{ScaleFactor} \quad [4]$$

$$S_Y = S_{Y-1} - \frac{\Delta \sin(\theta)}{ScaleFactor} \quad S_Y = S_{PrevLine} + \frac{\Delta \cos(\theta)}{ScaleFactor}$$

According to an embodiment of the invention, these are simplified scaling and rotating operations that may be used after a first output grid point is calculated relative to an input grid. Thus, the equations [2] described above that relate the input grid points to the output grid points can be first used to calculate an output grid point relative to the input grid. After that occurs, the remaining output grid points for the scaled and rotated output grid may be determined using the simplified scaling and rotating equations [4] directly above. According to an embodiment, the first output grid point may be the upper left corner point of the output grid, such as output grid point 270a in FIG. 2.

Once the first output grid point is calculated, such as the upper left corner point of the output grid, the left set of the above scaled and rotated grid equations [4] may be applied on a point by point basis as a horizontal output grid line is created. To move to the beginning of the next output grid line the right set of equations can be used based on the starting grid point of the previous line. The variable, ScaleFactor, makes the grid smaller for an upscale and larger for a downscale. Like the simplified calculations [3] described with respect to FIG. 2, the distance between input pixels may be defined as Δ and may even equal 1 when floating-point math is used. An illustrative and detailed example of these calculations is provided below.

FIG. 3 shows a pixel grid transformation 300 illustrating the conversion of an input image pixel grid 320 to a scaled and rotated image pixel grid 380, according to an illustrative embodiment of the present invention. The scaled and rotated image pixel grid 380 incorporates any angle of rotation and any scale amount. In particular, the input image pixel grid 320 includes input points 340a, 340b, . . . , 340x that identify the distinct center position of each input image pixel (illustrated with dashed lines) 360a, 360b, . . . , 360x that make up the image prior to its scaling and rotation. Similarly, the scaled and rotated image pixel grid 380 includes a plurality of output points 370a, 370b, . . . , 370x that represent the respective centers of output pixels (not illustrated) of a scaled and rotated version of the image. The input image pixel grid 320 is illustrated in FIG. 3 with dashed lines superimposed over the scaled and rotated image pixel grid 380 to illustrate that the scaled and rotated image pixel grid has undergone a scaling and rotating transformation 300. After the scaled and rotated pixel grid 380 is generated, calculations, such as bilinear interpolation, may be implemented to determine the output pixels values for the output pixels corresponding to the output points 370a, 370b, . . . , 370x.

A method of generating a scaled and rotated image using a scaled and rotated image pixel grid and a single calculation step according to an embodiment of the invention will next be described. It will be appreciated that floating point math may be implemented to effect the generation of the scaled and rotated image using algorithms running on a computing device having a processor, microprocessor, or the like. According to another embodiment, the methods and calculations described herein may be executed by an ASIC or other application-specific component or components that may be embedded within a computing device, such as a scanner-printer-copier multi-function devices. According to an aspect of the invention, fixed-point math may be used in any embodiments, though it will be appreciated by those of ordinary skill in the art that fixed-point math may be beneficial in simplifying calculations for an ASIC or other application-specific component or components. Thus, although the following illustrative example utilizes fixed point math, this represents only an illustrative an non-limiting example of a method for generating a scaled and rotated image according to the present invention.

ILLUSTRATIVE EXAMPLE

According to an illustrative embodiment of the present invention, the distance between each grid point of an input image is arbitrarily set to a large value. It will be appreciated that the size of this value affects the size of the increments with which the image may be rotated and scaled, where a larger value may be used to effect smaller scaling and rotation increments. For the illustrative example described herein, the value of 8192 is used, which allows for 0.1 or smaller rotation degree increments and 1% or smaller scaling increments up to 400% of the original image size. According to an embodiment, the sine and cosine values for each of the rotation increments may be precalculated, scaled by the arbitrary distance (e.g., 8192), and stored in a table. This permits the scaling and rotating operation to consist of addition, subtraction, and multiplication during real-time operation. Thus, a scaled and rotated output grid may be created while each output pixel value is calculated.

In this illustrative example a scaled and rotated output grid can be created for a scale of 133% and rotation of 22 degrees, which is approximately the scale and rotation of the scaled and rotated output grid 380 illustrated in FIG. 3. To achieve a rotation around the center of an input image the first output point calculation is made using the distance relative to the center input point. Therefore the calculation for the upper left output pixel (the starting point) will use distances of 8192 (1 pixel) for the X and Y coordinates, where the upper leftmost input point is positioned at −8192, −8192, which are the X,Y coordinates, respectively of the center of the upper leftmost pixel. In this example, all values are relative to the center of the image, which is the same for both the input image and the scaled and rotated output image. Thus, the center of the image is positioned at (0,0) and distances increase moving down and to the right. However, it will be appreciated that the rotation of an input image may also occur based on rotation around another point in the original image, such as a corner of the image, and that the example described herein would be altered accordingly using coordinate values keyed to that coordinate.

As described above, the coordinates of the first output pixel is determined using the equations from equation [2] and the upper leftmost input point (−8192, −8192):

$S_x = D_x \cos(\theta) + D_y \sin(\theta)$ $S_y = D_y \cos(\theta) - D_x \sin(\theta)$ $S_x = -8192 \cos(22) - 8192 \sin(22)$ $S_y = -8192 \cos(22) + 8192 \sin(22)$ $S_x = -10664$ $S_y = -4526$ Referring to the scaled and rotated image pixel grid 380 of FIG. 3 as representing this illustrative example, the first output pixel may be centered at −10664, −4526 from the center of the input 320 and output 380 grids, where the coordinates identify the location of output point 370a. Following the establishment of a first output point, the remainder of the output grid points can be determined using the simplified scaling and rotating equations [4]. For instance, the center of the next pixel directly adjacent the first output pixel on the top row of the output grid is calculated using the left scaling and rotating equations [4]:

$$S_X = S_{X-1} + \frac{\Delta\cos(\theta)}{ScaleFactor} \quad S_Y = S_{Y-1} - \frac{\Delta\sin(\theta)}{ScaleFactor}$$

$$S_X = S_{X-1} + \frac{8192\cos(22)}{1.33} \quad S_Y = S_{Y-1} - \frac{8192\sin(22)}{1.33}$$

$$S_X = -10664 + 5710 \quad S_Y = -4526 - 2307$$

$$S_X = -4954 \quad S_Y = -6833$$

It will be appreciated that a significant portion of the scaled and rotated grid equations [4] are constant once the rotation angle and scaling factor are know. For instance, along the top row of the scaled and rotated output grid, each of the output points are separated by X,Y coordinates of 5710, −2307. Using these equations results in the output point coordinates for the top line of the output grid:

Pixel 1, Line 1: (−10664, −4526)
Pixel 2, Line 1: (−4954, −6833)
Pixel 3, Line 1: (756, −9140)
Pixel 4, Line 1: (6466, −11447)

The next line in the output grid is started using the right scaling and rotating equations [4]:

$$S_X = S_{PrevLine} + \frac{\Delta\sin(\theta)}{ScaleFactor} \quad S_Y = S_{PreLine} + \frac{\Delta\cos(\theta)}{ScaleFactor}$$

$$S_X = -10664 + 2307 \quad S_Y = -4526 + 5710$$

$$S_X = -8357 \quad S_Y = 1184$$

Continuing with these equations results in the following grid of output points:

| | | | |
|---|---|---|---|
| (−10664, −4526) | (−4954, −6833) | (756, −9140) | (6466, −11447) |
| (−8357, 1184) | (−2647, −1123) | (3063, −3430) | (8773, −5737) |
| (−6050, 6894) | (−340, 4587) | (5370, 2280) | (11080, −27) |
| (−3743, 12604) | (1967, 10297) | (7677, 7990) | (13387, 5683) |

After the above coordinates for the output grid are determined, their coordinates (modulo 8192) and the values of the pixels may be used in the bilinear interpolation equation [1] to obtain the pixel values corresponding to each output point. It will be appreciated that output points that do not fall inside of an input grid do not have enough information for a bilinear interpolation. However, if these points are within 1 grid point (in the above example, ±8192, ±8192), of the input grid, the output pixel value can be approximated by a linear interpolation between the two closest input grid points. Alternatively, bilinear interpolation may also be used with the unknown pixel values set to a constant background color such as white.

Otherwise, any output grid point falling outside of the input grid can be assigned a constant background color such as white.

To illustrate interpolation in the illustrative example, pixel values will be arbitrarily chosen for the input grid in order to perform the linear interpolation. For instance, the following values are chosen for the input grid pixels:

TABLE 1

Illustrative Pixel Values

|  | Pixel 1 | Pixel 2 | Pixel 3 |
|---|---|---|---|
| Line1 | 60 | 130 | 230 |
| Line2 | 105 | 220 | 245 |
| Line3 | 200 | 235 | 255 |

For instance, in FIG. 3, the upper leftmost pixel 360a (Pixel 1, Line 1) may have a value of 60, the adjacent pixel on the same line 360b (Pixel 2, Line 1) may have a value of 130, the bottom rightmost pixel 360x (Pixel 3, Line 3) may have a value of 255, and so forth.

In the output grid, Pixel 1 of Line 1 (−10664, −4526) falls outside of the input grid and therefore will receive a background color, such as white (having a value of 255). Pixel 2 of Line1 has a grid point of −4954,−6833 and thus falls between the upper-left four input points. For the X portion of the bilinear interpolation, distances of 4954 and 3238 (8192 minus 4954) will be used when solving for equations [1] for the top and bottom pixel pairs of the input grid:

$$\text{Value}(pt3) = \frac{\text{Dist}(pt3-pt1)}{\text{Dist}(pt2-pt1)} * \text{Value}(pt2) + \frac{\text{Dist}(pt2-pt3)}{\text{Dist}(pt2-pt1)} * \text{Value}(pt1)$$

$$X_{TOP} = \frac{4954}{8192}*60 + \frac{3238}{8192}*130 \quad X_{BOTTOM} = \frac{4954}{8192}*105 + \frac{3238}{8192}*220$$

$$X_{TOP} = 88 \quad X_{BOTTOM} = 150$$

The distances for the final linear interpolation in the Y direction are 6833 and 1359 (8192 minus 6833), and the values will be $X_{TOP}$ and $X_{BOTTOM}$ as calculated above:

$$L1P2 = \frac{6833}{8192}*88 + \frac{1359}{8192}*150$$

$$L1P2 = 98$$

The output pixel value for Pixel 2 of Line 1 (L1P2) will be 98. Utilizing this method all of the other pixel values in the output image can be calculated.

FIG. 4 is a block diagram flowchart illustrating a method of implementing the scaling and rotating of an image in a single operation, according to an embodiment of the invention. First, an input image pixel grid is provided (block 400), where the input image pixel grid is representative of an image to be scaled and rotated. According to an embodiment, the distance between each grid point of the input image grid is established (block 410). Using the distance between each grid point, a first output point in the scaled and rotated image pixel grid is calculated (block 420), and then used to calculate the remainder of the output grid points using scaling and rotating equations (block 430). Finally, after the locations of the output points are determined, the pixel values for each output pixel are calculated using interpolation, such as bilinear interpolation (block 440).

It will be appreciated that each of the methods described above may be implemented by computer software and/or hardware, as described next with reference to FIG. 5. FIG. 5 shows a block diagram of an image scaling and rotating module 500, according to an embodiment of the present invention. As illustrated in FIG. 1, the image scaling and rotating module 500 generally includes a processor 572, operating system 574, memory 576, input/output (I/O) interface 582, database 584 and bus 580. The bus 580 includes data and address bus lines to facilitate communication between the processor 572, operating system 574 and the other components within the module 500, including the output grid calculation module 578, pixel module 579, the input/output interface 582, and the database 584. The processor 572 executes the operating system 574, and together the processor 572 and operating system 574 are operable to execute functions implemented by the image scaling and rotating module 500, including software applications stored in the memory 576, as is well known in the art. Specifically, to implement the methods described herein with respect to FIGS. 3 and 4 the processor 572 and operating system 574 are operable to execute the output grid calculation module 578 and pixel module 579 stored within the memory 576. According to one aspect of the invention, the output grid calculation module 578 and pixel module 579 may include one or more algorithms for executing the methods and processes described above with respect to FIGS. 3 and 4 and each of the equations [1]-[4] described herein.

It will be appreciated that the memory 576 in which the output grid calculation module 578 and pixel module 579 reside may include random access memory, read-only memory, a hard disk drive, a floppy disk drive, a CD Rom drive, or optical disk drive, for storing information on various computer-readable media, such as a hard disk, a removable magnetic disk, or a CD-ROM disk. Generally, the output grid calculation module 578 and pixel module 579 receives information input or received by the image scaling and rotating module 500, including input image data 586 and calculated table data 588. Using information it receives, the output grid calculation module 578 and pixel module 579 effect the methods described in detail above with respect to FIGS. 3 and 4 to calculate an output grid and calculate output pixel values based on a single calculation, such as may be implemented using interpolation. Therefore, the output grid calculation module 578 and pixel module 579 may be operable to execute computations, analyze digital images, process information, and the like, as needed to execute the methods described herein.

Referring again to FIG. 5, the processor 572 is in communication with the I/O interface 582 to control and communicate with I/O devices. Typical user I/O devices may include a scanner or printer hardware or software, as well as other input or output devices. Additionally, the I/O interface 582 may provide one or more I/O ports and/or one or more network interfaces that permit the image scaling and rotating module 500 to communicate with network devices. Therefore, the I/O interface 582 may also include a system, such as a modem, for effecting a connection to a communications network.

The database 584 of the image scaling and rotating module 500, which is connected to the bus 580 by an appropriate interface, may include random access memory, read-only memory, a hard disk drive, a floppy disk drive, a CD Rom drive, or optical disk drive, for storing information on various computer-readable media, such as a hard disk, a removable magnetic disk, or a CD-ROM disk. In general, the purpose of the database 584 is to provide non-volatile storage to the image scaling and rotating module 500. As shown in FIG. 5, the database includes one or more tables, segments or files within the database 584 to store input image data 586 and calculated table data 588. As described above, the input image data 586 is used to generate an output grid and to perform an interpolation operation to generate a scaled and rotated image from an input image. The calculated table data 584 may be used to store calculated information, including precalculated information, to result in efficient operation of the scaling and rotation module 500, as described above.

It is important to note that the computer-readable media described above with respect to the memory 576 and database 582 could be replaced by any other type of computer-readable media known in the art. Such media include, for example, magnetic cassettes, flash memory cards, digital video disks, and Bernoulli cartridges. It will be also appreciated by one of ordinary skill in the art that one or more of the image scaling and rotating module 500 components may be located geographically remotely from other image scaling and rotating module 500 components. It should also be appreciated that the components illustrated in FIG. 5 support combinations of means for performing the specified functions described herein. As noted above, it will also be understood that each of the methods described above, including the processes and computations described with reference to FIGS. 3 and 4, can be implemented by special purpose hardware-based computer systems that perform the specified functions or steps, or combinations of special purpose hardware and computer instructions. Further, the image scaling and rotating module 500 may be embodied as a data processing system or a computer program product on a computer-readable storage medium having computer-readable program code means embodied in the storage medium. Any suitable computer-readable storage medium may be utilized including hard disks, CD-ROMs, DVDs, optical storage devices, or magnetic storage devices.

Additionally, although illustrated individually in FIG. 5, each component of the image scaling and rotating module 500 may be combined with other components within the image scaling and rotating module 500 to effect the functions described herein. Accordingly, the image scaling and rotating module 500 may take the form of an entirely hardware embodiment, an entirely software embodiment or an embodiment combining software and hardware aspects, such as an ASIC, firmware, or the like.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of scaling and rotating an image, comprising:
   identifying an input pixel grid for the image;
   determining a center point of the input pixel grid;
   determining a first output point for an output pixel grid for the image, wherein determining the first output point is based at least in part on scaling and rotating the input pixel grid simultaneously by a transformation operation, wherein determining the first output point comprises determining the first output point relative to the center point of the input pixel grid;
   determining a plurality of remaining output points for the output pixel grid based at least in part on the determined first output point, wherein determining each remaining output point is based upon a position of an already-determined, neighboring output point, wherein determining remaining output points $(S_x, S_y)$ on an output grid line uses the equations $$S_X = S_{X-1} + \frac{\Delta \cos(\theta)}{ScaleFactor} \text{ and}$$
$$S_Y = S_{Y-1} - \frac{\Delta \sin(\theta)}{Scalefactor}$$

and determining remaining output point $(S_x, S_y)$ at a beginning of a new grid line uses the equations $$S_X = S_{PrevLine} + \frac{\Delta \sin(\theta)}{ScaleFactor} \text{ and}$$
$$S_Y = S_{PrevLine} + \frac{\Delta \cos(\theta)}{Scalefactor}$$

where $\Delta$ is a distance between input grid points, $\theta$ is a rotation angle for the output image, ScaleFactor is an amount of scaling of the input image, and $S_{PrevLine}$ is an output grid point at a beginning of an adjacent line; and
determining a plurality of output pixel values for an output image based at least in part on the determined output points, wherein determining the first output point, the remaining output points and the plurality of output pixel values are performed by a processor.

2. The method of claim 1, wherein the transformation operation comprises a calculation based, at least in part, on both a scaling factor and an angle of rotation, and wherein the scaled and rotated version of the image is scaled by an amount identified by the scaling factor and rotated by an amount identified by the angle of rotation.

3. The method of claim 2, wherein the transformation operation is an upscale or a downscale.

4. The method of claim 3 wherein the transformation operation comprises a rotation.

5. The method of claim 1, wherein determining a plurality of output pixel values comprises determining a plurality of output pixel values utilizing an interpolation operation.

6. The method of claim 5, wherein the interpolation operation comprises bilinear or bicubic interpolation.

7. The method of claim 5, wherein the interpolation operation is implemented by an Application Specific Integrated Circuit (ASIC).

8. The method of claim 1, further comprising storing at least one table, and wherein the at least one table is used, in part, to generate the scaled and rotated output image.

9. The method of claim 1, wherein determining a plurality of remaining output points for the output pixel grid comprises:
   (a) determining one or more output points that are located in a same line of the output pixel grid as the first output Point;
   (b) determining an output point located in an adjacent line of the output pixel grid; and
   (c) repeating steps (a) or (b) until the output pixel grid is formed.

10. A method of scaling and rotating a pixel grid, comprising:
- generating a first output point for an output pixel grid from an input pixel grid by at least one calculation implementing the simultaneous scaling and rotation of the input pixel grid and based on a center point of the input pixel grid;
- completing the output pixel grid by generating one or more remaining output points based at least in part on the generated first output point, wherein generating each remaining output point is based upon a position of an already generated, neighboring output point, wherein generating remaining output points ($S_x$, $S_y$) on an output grid line uses the equations $$S_X = S_{X-1} + \frac{\Delta \cos(\theta)}{ScaleFactor} \text{ and}$$

$$S_Y = S_{Y-1} - \frac{\Delta \sin(\theta)}{Scalefactor}$$

and generating remaining output point ($S_x$, $S_y$) at a beginning of a new grid line uses the equations $$S_X = S_{PrevLine} + \frac{\Delta \sin(\theta)}{ScaleFactor} \text{ and}$$

$$S_Y = S_{PrevLine} + \frac{\Delta \cos(\theta)}{Scalefactor}$$

where $\Delta$ is a distance between input grid points, $\theta$ is a rotation angle for the output image, ScaleFactor is an amount of scaling of the input image, and $S_{PrevLine}$ is an output grid point at a beginning of an adjacent line; and
determining the values of a plurality of output pixels of the output pixel grid, wherein generating the one or more remaining output points and determining the values of the plurality of output pixels of the output pixel grid are performed in an integrated circuit.

11. The method of claim 10, wherein determining the values of the plurality of output pixels comprises determining the values of the plurality of output pixels using interpolation.

12. The method of claim 11, wherein interpolating comprises bilinear or bicubic interpolation.

13. The method of claim 10, wherein scaling the input pixel grid comprises scaling the input pixel grid based at least in part on a scaling factor.

14. The method of claim 10, wherein scaling the input pixel grid comprises upscaling the input pixel grid or downscaling the input pixel grid.

15. The method of claim 10, wherein rotating the input pixel grid comprises rotating the input pixel grid based at least in part on an angle of rotation.

16. The method of claim 9, further comprising storing at least one table, and wherein the at least one table is used, in part, to generate the output pixel grid.

17. A method for image rotation and scaling, comprising:
- generating a first output point of a rotated and scaled output pixel grid from an original image pixel grid by at least one calculation implementing the simultaneous scaling and rotation of the input pixel grid and based on a center of the input pixel grid;
- generating one or more remaining output points of the rotated and scaled output pixel grid based at least in part on the generated first output point and based upon a position of an already generated, neighboring output point, wherein generating remaining output points ($S_x$, $S_y$) on an output grid line uses the equations $$S_X = S_{X-1} + \frac{\Delta \cos(\theta)}{ScaleFactor} \text{ and}$$

$$S_Y = S_{Y-1} - \frac{\Delta \sin(\theta)}{Scalefactor}$$

and generating remaining output point ($S_x$, $S_y$) at a beginning of a new grid line uses the equations $$S_X = S_{PrevLine} + \frac{\Delta \sin(\theta)}{ScaleFactor} \text{ and}$$

$$S_Y = S_{PrevLine} + \frac{\Delta \cos(\theta)}{Scalefactor}$$

where $\Delta$ is a distance between input grid points, $\theta$ is a rotation angle for the output image, ScaleFactor is an amount of scaling of the input image, and $S_{PrevLine}$ is an output grid point at a beginning of an adjacent line; and
determining the value of at least one output pixel of the output pixel grid based at least in part on the output pixel grid and the original image pixel grid, wherein generating the one or more remaining output points and determining the value of at least one output pixel are executed by a processor.

18. The method of claim 17, further comprising establishing a distance between one or more grid points of the original image pixel grid.

19. The method of claim 18, further comprising using the distance to generate the rotated and scaled output pixel grid.

20. The method of claim 18, further comprising using the distance to interpolate to determine the value of the at least one output pixel.

21. The method of claim 18, further comprising storing at least one table, and wherein the at least one table is used, in part, to generate the rotated and scaled output pixel grid.

* * * * *